United States Patent
Chun et al.

(10) Patent No.: US 7,462,236 B2
(45) Date of Patent: Dec. 9, 2008

(54) GLUCONATE BROTH FOR CEMENT AND CONCRETE ADMIXTURE

(75) Inventors: Byong-Wa Chun, Newton Upper Falls, MA (US); Ara A. Jeknavorian, Chelmsford, MA (US); Charlotte B. Porteneuve, Boston, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 427 days.

(21) Appl. No.: 10/580,949

(22) PCT Filed: Nov. 18, 2004

(86) PCT No.: PCT/US2004/038915

§ 371 (c)(1),
(2), (4) Date: May 30, 2006

(87) PCT Pub. No.: WO2005/054149

PCT Pub. Date: Jun. 16, 2005

(65) Prior Publication Data

US 2007/0107638 A1   May 17, 2007

(51) Int. Cl.
C04B 24/10 (2006.01)
(52) U.S. Cl. .................. 106/729; 106/730
(58) Field of Classification Search ............ 106/729, 106/730
See application file for complete search history.

(56) References Cited

U.S. PATENT DOCUMENTS

| | | | |
|---|---|---|---|
| 2,435,594 A | 1/1948 | MacPherson | 106/809 |
| 3,503,768 A | 3/1970 | Previte et al. | 106/730 |
| 3,857,715 A | 12/1974 | Humphrey | 106/729 |
| 3,885,985 A | 5/1975 | Serafin et al. | 106/820 |
| 4,073,658 A | 2/1978 | Ohtani et al. | 106/729 |
| 4,286,991 A | 9/1981 | Galer et al. | 106/696 |
| H493 H | 7/1988 | Tegiacchi et al. | 106/93 |
| 4,786,331 A | 11/1988 | Ueda et al. | 524/8 |
| 4,843,173 A | 6/1989 | Saito et al. | 562/531 |
| 4,892,586 A | 1/1990 | Watanabe et al. | 106/725 |
| 5,626,666 A | 5/1997 | Briat et al. | 106/728 |
| 5,880,182 A | 3/1999 | Minomiya et al. | 524/5 |
| 5,897,995 A | 4/1999 | Vroemen et al. | 435/137 |
| 6,797,050 B2 | 9/2004 | Hoffman et al. | 106/696 |
| 2003/0010254 A1 | 1/2003 | Mentink et al. | 106/170.41 |

FOREIGN PATENT DOCUMENTS

| JP | 50-01120 | 1/1975 |
|---|---|---|
| JP | 54-128934 | 10/1979 |
| JP | 58009863 | 1/1983 |

(Continued)

OTHER PUBLICATIONS

International Search Report, PCT/US04/38915, Dated Apr. 7, 2005, 1 page.

Hustede, "Gluconic Acid", *Ullmann's Encyclopedia of Industrial Chemistry*, (Wiley-VCH Verlag GmbH & Co. KgaA.), Online posting Date: Jun. 15, 2000., 5 pages.

(Continued)

*Primary Examiner*—Paul Marcantoni
(74) *Attorney, Agent, or Firm*—Craig K. Leon; Stephan P. Williams

(57) ABSTRACT

Methods and compositions of the invention involve the use of crude intermediate fermentation broth, derived from industrial glucose fermentation processes prior to completion of purification steps, as additives and admixtures for cementitious compositions.

24 Claims, 6 Drawing Sheets

FOREIGN PATENT DOCUMENTS

| | | |
|---|---|---|
| JP | 61-40854 | 2/1986 |
| JP | 06-92704 | 4/1994 |
| JP | 09-40447 | 2/1997 |
| JP | 09-255388 | 9/1997 |
| JP | 200327382 | 11/2000 |
| WO | WO/92/18637 | 10/1992 |

OTHER PUBLICATIONS

Milsom, "Gluconic and Itaconic Acids", *Comprehensive Biotechnology*, vol. 3, 1985, pp. 681-689.

PMP Fermentation Products, Inc., "PMP Liquid Gluconate", http:www.pmpinc.com/product/gluconates/liquid.html., printed Oct. 29, 2003, 3 pages.

(PRIOR ART: NMR spectrum of pure sodium gluconate)

GLUCONATE BROTH FOR CEMENT AND CONCRETE ADMIXTURE

FIELD OF THE INVENTION

The present invention relates to gluconate concrete admixtures, and more particularly to methods and compositions wherein a crude fermentation broth, obtained as an intermediate byproduct of an industrial-scale glucose fermentation process, is used for modifying cementitious compositions.

BACKGROUND OF THE INVENTION

It is known to use sodium gluconate as a regulating agent in concrete, and up until the present invention it has been used in relatively pure form. Sodium gluconate is a sodium salt of gluconic acid, which may be produced from glucose by fermentation. Glucose fermentation processes for the production of gluconates and gluconic acid are known. Microorganisms such as *Aspergillus* (hereinafter referred to as "*A. niger*"), *Acetobacter*, *Bacillus*, *Pseudomonas*, *Gluconobacter*, and *Penicillium* are known to be able to oxidize glucose into gluconates and gluconic acid. See e.g., World Patent Application WO/92/18637 of Asakura et al., page 2, lines 10-15.

It is hypothesized by Milson and Meers that the steps by which *Aspergillus niger*, *A. suboxydans* or *Ps ovalis* produce gluconic acid or gluconates are relatively few in number, consisting of the conversion of glucose to β-D-gluco-pyranose, and subsequent removal of two hydrogen atoms from β-D-gluco-pyranose to yield D-glucono-δ-lactone, and the hydrolysis of the latter to gluconic acid or a gluconate. (See P. E. Milson and J. L. Meers, "Gluconic and Itaconic Acids," Comprehensive Biotechnology (Pergomon Press Ltd., Oxford, England 1985), Page 687, Chapter 35.4).

FIG. 1 illustrates a layout of a plant suitable for sodium gluconate and gluconic acid production using a microorganism such as *A. niger*. (See P. E. Milson and J. L. Meers, "Gluconic and Itaconic Acids," Comprehensive Biotechnology (Pergomon Press Ltd., Oxford, England 1985), Page 684, Chapter 35.3.3). The prepared medium, which may include glucose, nutrients, and water, is sterilized continuously before the fermentation stage. Sterilization can alternatively be achieved in a fermenter, but this could lead to excessive darkening of the medium, and thus it is preferred to sterilize the medium outside the fermenter, which may be steamed and thus separately sterilized.

The nutrients used for gluconate production are typically carbohydrate sources including glucose either in the form of glucose monohydrate crystals or dextrose syrup. Additionally, sources of nitrogen (such as ammonium salts, urea, corn steep liquor), phosphate, potassium, and magnesium help to grow the microorganisms. It has been said that crude nitrogen and phosphate sources such as corn steep liquor can be avoided to minimize excessive cell growth which could in turn decrease gluconate production. In the absence of such sources, however, it is necessary to include trace amounts of iron, copper, and zinc in the medium.

The first stage of fermentation is the growth of vegetative inoculum. A suspension of cultured and selected *Aspergillus niger* (e.g., NRRL 3) is introduced into the inoculum fermenter, and initial pH is adjusted to about 6.5 with sodium hydroxide. Both the inoculum fermenter and production fermenter are typically stainless steel tanks that are stirred, baffled, and sparged with air. Antifoaming agents can be fed continuously into both fermenters to counteract foaming due to the sparging operation.

The second stage is "product fermentation," namely, the fermentation of the glucose medium using the inoculum from the first stage. After spore germination and growth of mycelium at 30-33° C., inoculum is transferred to the production fermenter at a rate of about 1 part inoculum to about 10 parts production medium. Transfer may occur when a sufficient amount of mycelium is grown, or when an increase in glucose oxidase activity is detected in the mycelium. The medium in the production fermenter may contain glucose in a concentration of, for example, 220 kg glucose $m^{-3}$, and its pH can be maintained automatically (~6-7 pH) by monitoring with a pH electrode, which is preferably sterilizable, and adding sodium hydroxide (NaOH) as necessary.

The fermentation broth is usually kept at about 30-33° C. and agitated by sparging with air (e.g., 1.5 volume air/1.0 volume medium/minute), preferably with back pressure up to 2 bar on the production fermenter. The progress of gluconate production may be gauged by observing the rate of sodium hydroxide addition. Fermentation can be completed in as little as 19 hours.

The second (production) fermentation stage yields a crude intermediate fermentation broth that is then subjected during industrial process to a number of purification steps. The purification steps include the use of filtration, a decolorizer, and a clarifier to obtain gluconate or gluconic acid in substantially pure form. The purification steps are illustrated in FIG. 1 and discussed below.

In the purification step designated "broth filter" in FIG. 1, the fermentation broth is filtered (and/or otherwise centrifuged) to remove mycelium cell material, which is consequently destroyed by incineration or otherwise removed. The mycelium can be discarded or re-used. At this point, the broth contains minimal residual glucose.

In the next purification step designated "decolorizer" in FIG. 1, the fermentation broth is then passed through activated carbon to remove color, which is believed to be due to protein and other materials.

In the subsequent purification step designated "clarifier" in FIG. 1, the fermentation broth is clarified to remove fine particles from the fluid suspension, such as through the use of centrifugation.

After all three purification stages, the fermentation broth is evaporated to increase gluconic acid/gluconate concentration. If a 50% gluconic acid solution is desired, the broth is taken from the evaporator and passed through a cation exchanger to remove sodium ions (FIG. 1). If a technical grade of sodium gluconate (e.g., 98% purity) is desired, the liquor is dried directly by spray drying. If a pure grade of sodium gluconate is desired, the concentrated liquor is transferred from the evaporator to a crystallizer. An appropriate organic solvent, such as ethanol, may then be added, whereupon D-gluconic acid crystals can be obtained in salt form. The gluconate crystals are centrifuged to separate them from the so-called "mother liquor."

This mother liquor, containing gluconate in the amount of about 60-75% based on total solids in the composition, may be re-circulated back to an earlier process step, or may be used as a liquid concrete admixture, as has been the customary practice in the concrete industry.

SUMMARY OF THE INVENTION

The present invention is prompted by the discovery that crude intermediate fermentation broth obtained from the industrial fermentation of glucose-containing starting products (e.g., glucose syrup), before completion or substantial completion of the three above-described purification steps, provides a useful gluconate- or gluconic acid-containing additive or admixture for modifying cementitious compositions.

Such a material may be obtained with far less energy, time, and expenditure of labor and resources than would be the case were the afore-mentioned industrial fermentation and recovery process run through all three purification steps.

Moreover, the inventors were surprised by their discovery that, in comparison to pure gluconate, the crude intermediate fermentation broth provided a performance advantage, namely, a quicker setting time, when deployed in cementitious compositions. Yet, the crude intermediate fermentation broth provided a compressive strength in the cementitious composition comparable to that attributed to pure gluconate alone.

The crude intermediate fermentation broth, removed from the industrial gluconate process, contains gluconate and minimal residual glucose, plus other byproducts such as oxalic acid or salt thereof, residual oligosaccharides, and other byproducts. Exemplary broths suitable for use in the present invention may comprise 5-95% by wt gluconic acid or the salt thereof (e.g., calcium, potassium, or sodium) based on total solids in the broth.

Thus, exemplary methods and compositions of the invention comprise: combining a hydratable cementitious binder with crude fermentation broth obtained from the above-described industrial glucose fermentation process, at an intermediate step before the "clarifier" step, more preferably before the "decolorizer" step, and, most preferably, before the "broth filter" that removes mycelium cell material.

In preferred embodiments, the crude fermentation broth is obtained from industrial fermentation process at an intermediate step prior to completion of purification steps, whereby glucose and starch hydrolysate (e.g., corn syrup) are employed in the fermentation medium. The advantage of doing this is that glucose contained in the starch hydrolysate can be reduced into usable gluconic acid or its salt (e.g., 5-98% by wt solids), and the broth may contain oligosaccharides (2-95% by wt solids) and/or higher sugars left unaffected by action of the microorganisms. Accordingly, it is believed that the use of starch hydrolysate, which presents a lower Dextrose Equivalent (DE) carbon source, may be used for generating a suitable cement dispersion product, in comparison to the high DE dextrose syrup used exclusively in the industrial glucose fermentation process at present.

Further compositions comprise mixtures of the crude glucose fermentation broth with conventional cement additives and concrete or mortar admixtures. Cementitious compositions comprising a cement binder and the broth are also contemplated.

Accordingly, other advantages and features of the invention will be further appreciated when considered in the context of the detailed description of exemplary embodiments hereinafter provided.

DETAILED DESCRIPTION OF EXEMPLARY EMBODIMENTS

The term "glucose fermentation" refers to a process whereby a glucose-containing composition, including compositions containing polysaccharides and/or oligosaccharides, are processed using a microorganism that contains an enzyme that oxidizes glucose into various byproducts such as gluconolactones, which are in turn hydrolyzed to gluconic acid and its salt form (e.g., gluconate).

The term "cementitious composition" as may be used herein includes pastes (or slurries), mortars, and grouts, such as oil well cementing grouts, shotcrete, and concrete compositions comprising a hydraulic cement binder. The terms "paste", "mortar" and "concrete" are terms of art: pastes are mixtures composed of a hydratable (or hydraulic) cement binder (usually, but not exclusively, Portland cement, Masonry cement, Mortar cement, and/or gypsum, and may also include limestone, hydrated lime, fly ash, granulated blast furnace slag, metakaolin, rice hull ash, and silica fume or other materials commonly included in such cements) and water, "mortars" are pastes additionally including fine aggregate (e.g., sand), and "concretes" are mortars additionally including coarse aggregate (e.g., crushed rock or gravel). The cement compositions described in this invention are formed by mixing required amounts of certain materials, e.g., a hydraulic cement, water, and fine and/or coarse aggregate, as may be required for making a particular cementitious composition.

Figure 1:
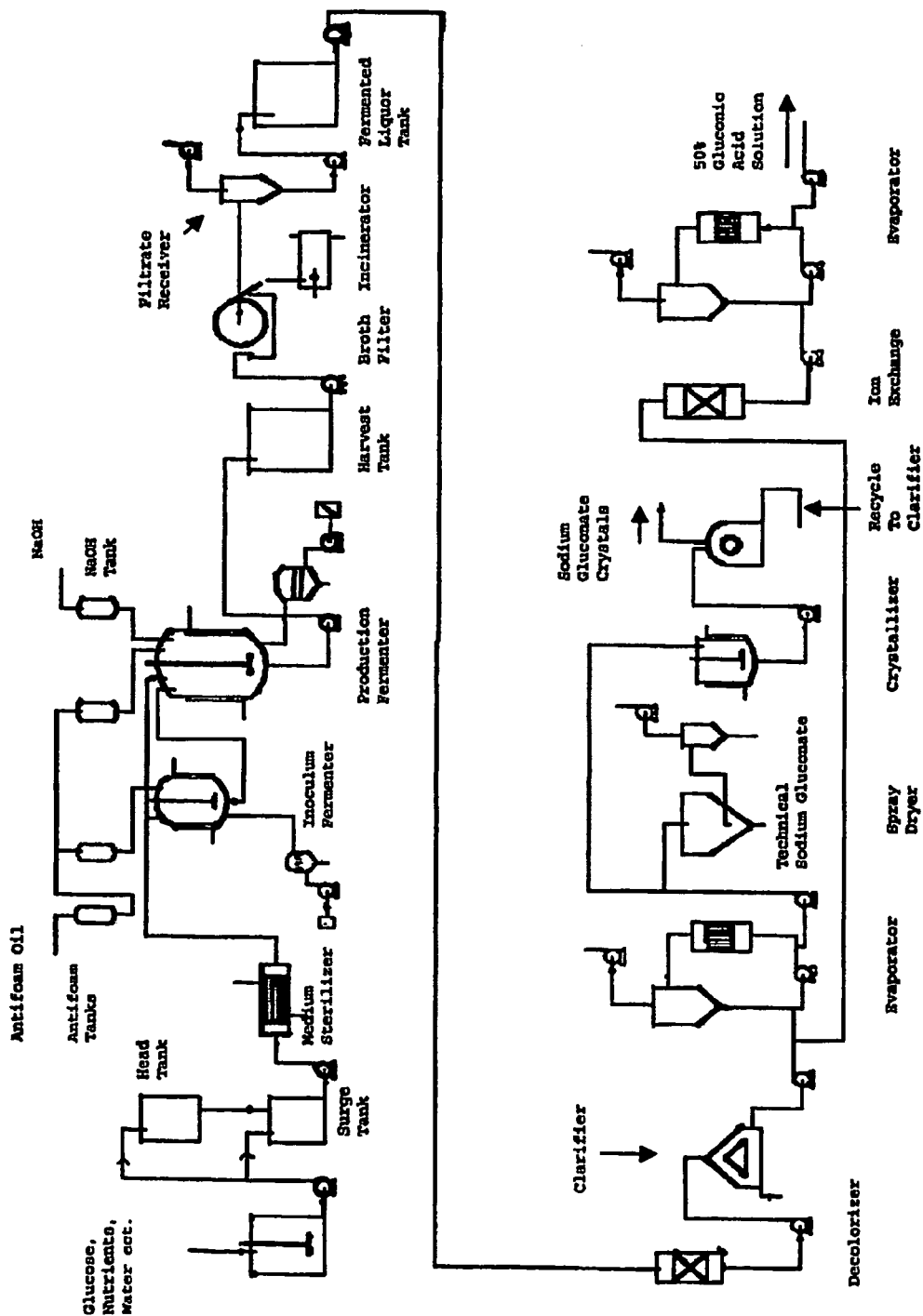
FIG. 1 is a plan diagram of a PRIOR ART industrial-scale glucose fermentation process that produces sodium gluconate in the form of solid crystals and a 50% gluconic acid solution.

As summarized previously, exemplary methods and compositions of the present invention comprise: combining a hydratable cementitious binder with a crude intermediate glucose fermentation broth, obtained from the above-described industrial glucose fermentation process before completion of all of the purification steps (broth filtration, decolorizer, and clarifier steps) as illustrated in FIG. 1. In other words, the "broth filtration" step, the "decolorizer" step, and/or the "clarifier" step may be bypassed and otherwise avoided. The fermented broth may optionally be condensed in an evaporator to increase the concentration of gluconic acid, gluconate, and/or other byproducts; but, in any case, the broth is removed before either the "spray drying" or "ion exchanger" phases illustrated in FIG. 1.

An exemplary method of the invention therefore comprises combining (1) a hydratable cementitious binder with (2) a crude glucose fermentation broth obtained from an industrial glucose fermentation process. The term "crude" here is used to refer to the broth which is not subjected to all three filtration, decolorizer, and clarifier steps, although it is possible to consider as "crude" a broth which is subjected to only one or two of these steps. Preferably, the crude broth is in the form of a suspension that is not subjected to the clarification step whereby finely suspended particles have been removed from the broth suspension.

Exemplary crude fermentation broths suitable for use in the present invention comprise: gluconic acid or the salt form in an amount of 5 to 98% (by wt) and at least one oligosaccharide selected from the group consisting of maltose, maltotriose, and higher sugars, the oligosaccharide being present in the amount of 1 to 95%, and more preferably in the amount of at least 2%; all percentages herein based upon total weight (dry) solids in the broth. More preferred broths comprise gluconic acid or the salt form thereof in the amount of 20 to 98% by wt and at least one oligosaccharide selected from the group consisting of maltose, maltotriose, and higher sugars, said oligosaccharide being present in the amount of 2 to 80% by wt. Most preferred broths comprise gluconic acid or salt thereof in the amount of 40 to 98% by wt and at least one oligosaccharide selected from the group consisting of maltose, maltotriose, and higher sugars, said oligosaccharide being present in the amount of 2 to 60% by wt solids in the broth.

Further exemplary broths may contain fermentation by-products such as oxalic acid, formic acid, lactic acid, or their respective salt forms, in an amount of 0-20% by wt based on total (dry) solids.

In exemplary methods, the broth is derived from a mixture of glucose and starch hydrolysate, wherein the starch hydrolysate is present in an amount no less than 1% by weight, and more preferably between 1-50% by weight, and contains an oligosaccharide selected from the group consisting of maltose, maltotriose, and higher sugars.

The crude intermediate glucose broth may be combined with a cementitious binder such as by mixing with cement clinker before or during the intergrinding process for manufacturing hydratable cement, or otherwise the broth can be mixed directly with cement binder powder in the manner of a concrete or mortar "admixture." (The term admixture may be taken to mean and refer to materials other than cement, water, and aggregates which are incorporated into cementitious compositions). Hence, the crude intermediate glucose broth can be combined with cement while the broth is in a liquid form, or the broth may be dried and used as a dry concentrate. The amount of broth to be added to the cement will depend upon the amount of gluconate and/or gluconic acid in the broth, and this amount can be computed based on the amount of gluconate needed, which will be in accordance with the general knowledge of those in the cement and concrete industry. The amount might be in the range of 0.005 to 5.0% s/s, and more preferably 0.05 to 1% s/s (solids based on solids cement). Alternatively, the amount of the crude fermentation broth can be dosed, based on total dry solids (actives) in the broth, per weight of cement binder.

As previously mentioned, a preferred method and composition involves combining a cement with a crude fermentation broth taken from an industrial fermentation process wherein starch hydrolysate is added with glucose in the fermentation production medium. The advantage of doing this is that the glucose contained in the starch hydrolysate can be converted as well into usable gluconate or gluconic acid.

The crude intermediate fermentation broth may be used in combination with conventional cement additives as may be known in the art. For example, cement additives may include one or more of the following materials: molasses, melamine sulfonate formaldehyde condensate, naphthalene sulfonate formaldehyde condensate, alkali or alkaline earth chloride, bromide, protein, alkanolamine, tall oil fatty acid, fatty acid or derivative thereof, fatty ester or derivative thereof, alkali or alkaline earth hydroxycarboxylic acid salt of gluconic acid, glucoheptonic acid, citric acid, tartaric acid, mucic acid, malic acid, salicylic acid, lignosulfonic acid, dye, sucrose, glucose, starch hydrolysate, sodium sarcosinate, alcohol, phenol, acetic acid, sodium hydroxide, potassium hydroxide, sodium linear alkylate sulfonate, formaldehyde, silica, diglycinate, polymers containing oxyalkylene groups, calcium formate, formic acid, siloxane, a surfactant, resin and rosin acids, polyacrylic acid, polyvinyl pyrrolidone, aluminate, nitrite, nitrate, silicate, carbonate, borate, phosphonate, lactate, sulfate, thiosulfate, benzoate, acetate, oxalate, ferricyanide, and succinate, glycols, borate ester, phosphonate ester, phosphate ester, phenol and derivative thereof, a natural gum, a starch, or derivatives (e.g., salts) of any of the foregoing.

The crude intermediate fermentation broth of the invention may also be used in combination with a conventional concrete or mortar admixture, such as a set accelerator, a set retarder, air detrainer, air entrainer, alkali-reactivity reducer, bonding admixture, water-reducing admixture (e.g., superplasticizer), colorant, corrosion inhibitor, a damp proofing admixture, gas former, permeability reducer, pumping aid, fungicidal admixture, germicidal admixture, insecticidal admixture, or a mixture thereof. See e.g., World Patent Application No. PCT/US98/17441 of W. R. Grace & Co.-Conn., describing known admixtures.

Polycarboxylic acid type superplasticizers are conventionally known in the concrete arts. Exemplary polycarboxylic acid/salt type superplasticizers which are contemplated for use in combination with the crude intermediate fermentation broths of the invention include so-called "EO/PO type comb polymers," a term which means and refers to a polymer having a backbone such as a carbon backbone to which are attached both carboxylate groups (which are believed to function as cement anchoring groups in the cementitious mixture) and ethylene oxide (EO) groups, propylene oxide (PO) groups, and/or a combination of EO/PO groups in the backbone of the comb polymer or, more preferably, in pendant groups attached to the backbone. The pendant groups may be ionic or non-ionic. Examples of BO/PO type comb polymer superplasticizers and water reducers are discussed or described in U.S. Pat. No. 6,352,952 of Jardine et al., U.S. Pat. No. 5,393,343 of Darwin et al.; as well as in U.S. Pat. Nos. 4,946,904; 4,471,100; 5,100,984; and 5,369,198 which describe comb polymers which are for example copolymers of polycarboxylic monomers such as maleic acid or anhydride and polymerizable EO/PO-containing monomers such as polyalkylene glycol monoallyl ethers, etc.

As will be the case with the other additives and admixtures mentioned herein, the superplasticizers or other water reducers can be combined with or incorporated into the crude fermentation broth, before being used in cementitious compositions, or they may be added separately to the cementitious composition along with the crude fermentation broth.

A further exemplary composition of the invention comprises the afore-mentioned crude intermediate fermentation broth and a cement dispersion agent selected from the group consisting of hydroxycarboxylic acids and the salts thereof (other than gluconic acid or gluconate) and ketocarboxylic acids and the salts thereof. Examples of the hydroxycarboxylic acids and salts thereof are citric acid, tartaric acid, malic acid, glycoheptoic acid, and hydroxybenzoic acid, and the salts thereof (e.g., sodium, potassium, calcium). Examples of the ketocarboxylic acids and the salts thereof are pyruvic acid, benzoylformic acid, acetoacetic acid, benzoylacetic acid, levulinic acid benzoylpropionic acid, and the salts thereof (e.g., sodium, potassium, and calcium).

A further exemplary composition of the invention comprises the afore-mentioned crude intermediate fermentation broth and at least one oxyalkylene-group-containing compound, preferably a polyoxyalkylene compound having repeating ethylene oxide (EO) groups, polyethylene oxide (PO) groups, or a mixture thereof. Such oxyalkylene group containing compounds, if further having cement-anchoring groups such as carboxylate moieties, can function as superplasticizers or water reducers. Such oxyalkylene-group-containing compounds may also function as air entraining agents and/or shrinkage reducing agents. Examples of oxyalkylene type shrinkage reducing agents are disclosed, for example, in U.S. Pat. Nos. 5,556,460 and 5,938,835.

Further exemplary compositions of the invention comprise the afore-mentioned crude intermediate fermentation broth in combination with at least two oxyalkylene-group-containing compositions, such as a first group which is operative to fluidify a cementitious composition, and a second group which is operative to reduce shrinkage or shrinkage cracking in hydratable cementitious compositions.

Another exemplary composition of the invention comprises the afore-mentioned crude intermediate fermentation broth in combination with an alkanolamine additive (or admixture), including but not limited to triethanolamine (TEA); methyl(diethanol)amine (MDEA); diethanolisopropanolamine (DEIPA); triisopropanolamine (TIPA); tetrahydroxyethylethylenediamine (THEED); and other alkanolamines. For example, the alkanolamine may be N,N-bis(2-hydroxyethyl)-2-propanolamine or N,N-bis(2-hydroxypropyl)-N-(hydroxyethyl)amine. An exemplary cementitious composition of the invention thus would comprise a hydratable cementitious binder and the afore-mentioned crude intermediate fermentation broth in combination with any of the foregoing alkanolamines.

Another exemplary composition of the invention comprises the afore-mentioned crude intermediate fermentation broth in combination with an amine additive (or admixture) having at least one hydroxyl group and/or ionic group, including but not limited to sarcosine and glycine. The broth may be used in a ratio wherein the contained gluconate content: amine additive content is 100:1 to 1:1 and more preferably 10:1 to 3:1. An exemplary cementitious composition of the invention thus would comprise a hydratable cementitious binder and the afore-mentioned crude intermediate fermentation broth in combination with an amine.

Another exemplary composition of the invention comprises the afore-mentioned crude intermediate fermentation broth in combination with an additive (or admixture) selected from the group consisting of an alkali, alkaline earth, Group III, or transition metal choride and/or bromide. The gluconic acid ("GA") and/or gluconate ("G") content of the broth may be used in a ratio (GA,G:additive) of 1:20 to 500:1 and more preferably 1:5 to 10:1.

Another exemplary composition of the invention comprises the afore-mentioned crude intermediate fermentation broth in combination with an additive (or admixture) selected from the group consisting of an alkali, alkaline earth, Group III, or transition metal salt (or acid or derivative thereof) of an aluminate, nitrite, nitrate, silicate, carbonate, borate, phosphonate, lactate, sulfate, thiosulfate, benzoate, acetate, oxalate, ferricyanide, succinate, or mixture thereof. The broth and additive may be used such that the GA,G:additive ratio is 1:100 to 100:1 and more preferably 1:20 to 20:1.

In a further exemplary composition of the invention, the aforementioned crude intermediate fermentation broth may be combined with at least one other additive (or admixture) selected from the group consisting of a glycol (e.g., polyethylene glycol), a glycerol, borate ester, phosphonate ester, phosphate ester, a phenol or phenolic derivative, a natural gum, a starch-derived compound, a hydrocolloid, or a mixture thereof. The broth and additive here may be combined in a GA,G:additive ratio of 500:1 to 1:1 and more preferably 10:1 to 2:1.

In a further exemplary composition of the invention, the aforementioned crude intermediate fermentation broth may be combined with at least one other additive (or admixture) selected from the group consisting of a waterproofing agent (e.g., calcium stearate); a finishing aid (e.g., polyether); an anti-freeze agent (e.g., calcium nitrite, calcium nitrtrate); a viscosity modifying agent (e.g., biopolymer S-657 or diutan gum, welan gum); a shrinkage reducing agent (e.g., oxyalkylene type); a strength enhancing agent (e.g., chloride, thiocyanate, alkanolamine); an anti-efflorescent agent (e.g., calcium stearate, calcium stearate dispersion); an expansive agent (e.g., calcium aluminates); a defoamer, a surface etching agent (e.g., water, oil, and solvent based surface retarders), and de-icing agent (e.g., chloride salts, glycol).

The crude intermediate fermentation broth is believed to be useful as dispersants or fluidity modifiers as well in oil well drilling muds; pesticide applications; carbon black (e.g., ink and pigment dispersant); dye manufacture; asphalt emulsions; water treatment (e.g., dispersant, scale inhibitor); lead acid batteries; leather tanning; micronutrients (e.g., metal chelating agents); industrial cleaners (e.g., dispersants for dirt, metal cleaner); ore beneficiation (e.g., lithium); metal plating; enhanced oil recovery, insulation; and others. The broth is also believed to be useful as a dispersant for noncementitious (i.e., non-hydratable) particles or particulate matter, such as metal oxides (e.g., titanium dioxide), dyes (e.g., anthraquinone dye, azo dye, aniline dye, stilbene, dye), pigments (e.g., zinc oxide, carbon black), fine silicas (e.g., silica fume, finely granulated silica), talc, clay (e.g., kaolin, bentonite), and other such particulate, particulated, or ground minerals, organic, or inorganic materials. Preferably, the dispersions are aqueous in nature. Accordingly, further exemplary compositions of the invention comprise an aqueous suspension having the crude intermediate fermentation broth and one or more of the above-identified minerals or materials in particulate form dispersed within the suspension.

Crude fermentation broth suitable for use in the present invention is removed from the industrial process prior to completion of the purifications steps (FIG. 1), and which may optionally be concentrated, such as by evaporation of liquid, is believed to comprise the following components: gluconic acid, gluconate, or glucono-lactone in an amount of 5-98% wt.; (optionally oxalic acid or salt thereof in an amount of 0-20% wt.); and maltose and/or higher oligosaccharides in an amount of 2-95% wt., all percentages expressed herein based on total weight solids in the composition.

Moreover, the pre-"broth filter" crude fermentation broth (i.e., broth removed before the broth filtration step) will likely contain mycelial mass from the microorganisms used in the fermentation, in an amount of 0.05-20 wt % based on total solids of the three components described above. Accordingly, exemplary methods and compositions of the invention comprise combining a hydratable cement binder with crude fermentation broth comprising mycelial mass in an amount of 0.05-20 wt %.

Furthermore, crude fermentation broth which is removed from the industrial process prior to the decolorizer step will have an amber color. Accordingly, exemplary methods and compositions of the invention comprise combining a hydratable cement binder with crude fermentation broth comprising an amber color.

Finally, crude fermentation broth which is removed from the industrial process prior to the clarifier step will have fine material suspended within the liquid suspension, and this fine suspended material is believed to comprise residues of microorganisms and particulates originating from the carbon sources and nutrients, as well as less soluble salt compounds generated by the fermentation process, including, but not limited to, organic acids other than gluconic acid. Accordingly, exemplary methods and compositions of the invention comprise combining a hydratable cement binder with crude fermentation broth comprising fermentation residues and byproducts as well as oligosaccharides and non-glucosic sugars and their derivatives originating from the carbon sources employed in the fermentation.

Further exemplary methods and compositions of the invention comprise a combination of (A) the crude intermediate glucose fermentation broth, as described above; and (B) at least one conventional cement additive, or concrete or masonry admixture. The amount of the additive or admixture will be known in the art, but can be anywhere from 0.005-5% by wt (based on total weight on cement), and most likely 0.05-1.0% (by total weight on cement).

The invention therefore also provides cementitious compositions comprising a hydratable cementitious binder and the combination of broth and conventional additive or admixture. Thus, in an exemplary cementitious composition, the hydratable cementitious binder comprises Portland cement, masonry cement, mortar cement, limestone, hydrated lime, fly ash, granulated blast furnace slag, a pozzolan, silica fume, metakaolin, or mixture thereof. Still further exemplary cementitious compositions comprise one or more aggregates, such as sand, gravel, crushed stone, or mixture thereof.

A preferred conventional cement additive or admixture that may be combined with the crude fermentation broth is an alkanolamine, such as triethanolamine, triisopropanolamine, diethanolpropanolamine, and others.

Other conventional cement additives, useful in combination with the crude intermediate glucose fermentation broth as described above, may be selected from the group consisting of molasses, a sulfonate, a melamine sulfonate formaldehyde condensate, a naphthalene sulfonate formaldehyde condensate, calcium chloride, sodium chloride, an amine, a protein, an alkanolamine, tall oil fatty acid, fatty acid or derivative thereof, fatty ester or derivative thereof, alkali and alkaline earth hydroxycarboxylic acid salts of gluconic acid, glucoheptonic acid, citric acid, tartaric acid, mucic acid, malic acid, salicylic acid a dye, sucrose, glucose, alkali, alkaline earth, a choride, a bromide, corn syrup, sodium sarcosinate, calcium or sodium lignosulfonate, lignin, alcohols, phenol, acetic acid, anhydrous caustic soda, sodium hydroxide, potassium hydroxide, sodium linear alkylate sulfonate, formaldehyde, silica, a diglycinate, polymers containing oxyalkylene groups, calcium formate, formic acid, siloxane, a surfactant, a resin, a resin acid, a rosin, a rosin acids, polyacrylic acid, polyvinyl pyrrolidone, alkali, alkaline earth, an aluminate, a nitrite, a nitrate, a silicate, a carbonate, borate, phosphonate, lactate, sulfate, thiosulfate, benzoate, acetate, oxalate, ferricyanide, succinate, glycols, borate ester, phophonate ester, phosphate ester, phenol and derivative thereof, a natural gum, a starch or derivative thereof, and hydrocolloids.

Conventional concrete or masonry admixtures, useful in combination with the crude intermediate glucose fermentation broth as described above, may be selected from the group consisting of an accelerator, retarder, air detrainer, air entrainer, alkali-reactivity reducer, bonding admixture, water-reducing admixture, superplasticizer, colorant, corrosion inhibitor, damp proofing admixture, gas forming agent, permeability reducer, pumping aid, fungicidal admixture, germicidal admixture, insecticidal admixture, waterproofing agents, finishing aids, anti-freeze agents, viscosity modifying agents, shrinkage reducing agents, shrinkage-compensating agents, strength enhancing agents, anti-efflorescence agents, expansive agents, and de-icing agent. Preferably, the concrete admixture has one or more oxyalkylene groups.

The following examples are provided for illustrative purposes only and are not intended to limit the scope of the invention.

EXAMPLE 1

Crude intermediate fermentation broths containing gluconate were obtained from PMP Fermentation Products, Inc. (Peoria, Ill.) and Jungbunzlauer International AG (Basel, Switzerland).

The following materials, which are believed to represent examples of the crude intermediate fermentation broths contemplated for use in the present invention are as follows. "Broth 1" was an unfiltered broth obtained from PMP. "Broth 2" was an unfiltered and concentrated broth obtained from Jungbunzlauer. "Broth 3" was a filtered and concentrated broth obtained from Jungbunzlauer. These samples were believed to have been obtained from the industrial glucose fermentation process (similar that illustrated in FIG. 1) at some point after the production fermentation such that the decolorizer and clarifier were not used on the fermentation broth, but before the fermentation was subjected to spray drying or ion exchange (see FIG. 1 after "Evaporator" step).

Each of the three sample broths where then analyzed using high-performance liquid chromatography HPLC) in a BIO-RAD® 87H organic acid column (250 mm×4.6 mm, 5 micron) with the following parameters. Guard column: 30 mm×4.6 mm, 5 micron; Mobile Phase: 0.01M Sulfuric acid (e.g., one gram of concentrated sulfuric acid dissolved in 1000 ml of polished water); Column Temperature: Ambient; Flow rate: 0.6 ml/min.; Injection volume: 15 µl; Run time: 15 minutes; Detector type: WATERS® 2487 UV detector set at 210 nm; WATERS® 410 Refractive Index Detector.

Figure 2:
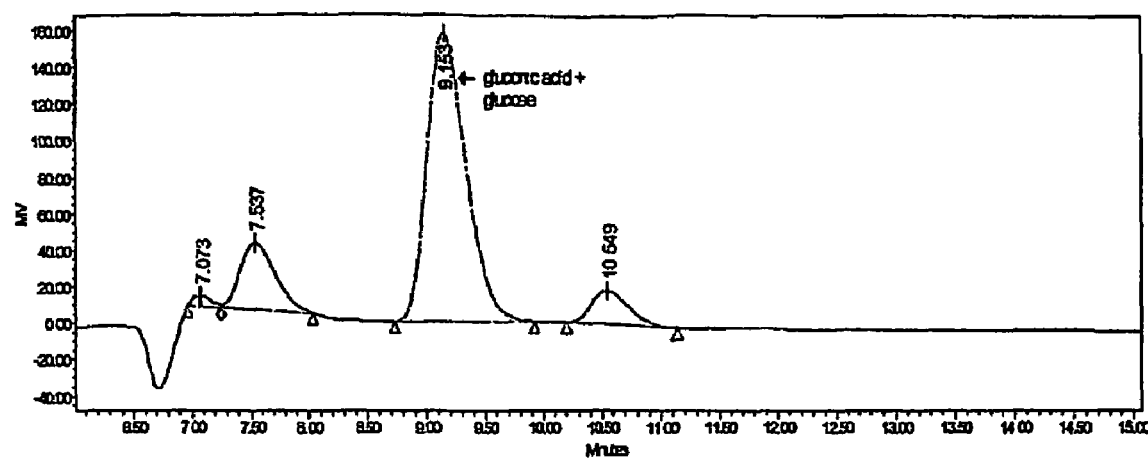
FIG. 2 is a chromatogram of an exemplary crude glucose fermentation broth in accordance with the present invention.
Figure 3:
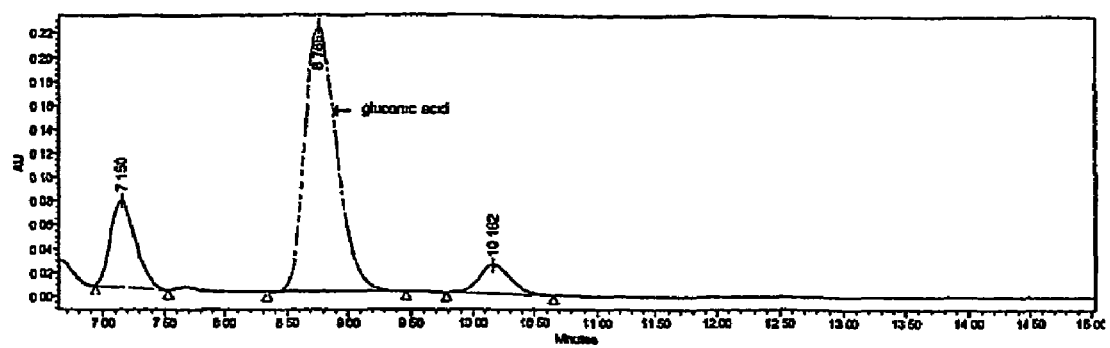
FIG. 3 is a chromatogram of another exemplary crude glucose fermentation broth in accordance with the present invention.

Glucose (97%) and sodium gluconate (96%) were used as standards during HPLC testing. Solutions of these standards were made using water. Different volumes (5, 10, 15, 20, and 30 microliters) were injected to calibrate the two detectors over a range of zero to 1% in solution. Typical HPLC elution profiles of Broth 3 are shown using RI detector and UV detector, respectively, in FIGS. 2 and 3.

There are three distinctive peaks in the elution profiles. The first peak at 7.12/7.6 (UV/RI) minutes is believed to signify oxalic acid. The RI detector uses the difference of the refractive index of eluting solvent to detect concentration of the substance contained in the elution solvent. Since most of the organic compounds consist of carbon, hydrogen, oxygen and nitrogen and have a similar refractive index, the output from the RI detector closely represents the concentration (weight per volume) of the substance contained in the elution solvent. Thus, the RI detector is sometimes referred to as a "concentration detector." Meanwhile, the UV detector employs UV light absorbance to detect a particular substance in the elution solvent. The UV absorbance is significantly different from compound to compound, and thus is not ideal for use as a universal concentration detector. The difference of the responses provided by the UV and RI detectors may provide useful insights as to the nature of the compounds in view of characteristic peaks detected by HPLC.

Accordingly, exemplary crude glucose fermentation broths of the invention, when subjected to HPLC using cationic resin packed column and an RI detector or UV detector at 210 nm UV light, demonstrate an elution profile (time vs. refractance) having at least two peaks, a first peak corresponding to gluconic acid or its salt form, and a second peak corresponding with oxalic acid or its salt form.

Different peak intensities from the RI and UV detectors suggest the 7.2-7.6 minutes peak also includes a compound with lower UV extinction coefficient than oxalic acid. The second main peak at 8.8/9.2 minutes is believed to be gluconic acid/gluconate. The third peak at 10.2/10.5 minutes is believed to be a gluconolactone because the peak disappears after the neutralization of the broth samples.

The first peak is believed to be distinctive for the broth samples, since the chromatogram of pure gluconate does not show a peak in that area. Table 1 below summarizes the HPLC results of all three broths. Under each of the headings (RI) and (UV) are given the percentages of oxalic acid, gluconic acid (GA), Gluconate (G), respectively:

TABLE 1

| | RI | | | UV | | |
|---|---|---|---|---|---|---|
| Sample | 7.6 min peak oxalic acid | 9.2 min peak GA | 9.2 min peak G | 7.2 min peak Oxalic acid | 8.8 min peak GA | 8.8 min peak G |
| Broth 1 | 1.70% | 26% | 29% | 0.15% | 26% | 29% |
| Broth 2 | 1.96% | 74% | 82% | 0.04% | 73% | 81% |
| Broth 3 | 2.44% | 78% | 87% | 0.04% | 76% | 84% |

Table 2 provided below shows the material balance in broths 2 and 3. As seen in Table 1, the material balance calculation did not correspond with the observed dry substance amount. It is surmised that in view of the potential loss of water by formation of lactone from gluconic acid, the disparity could have been even greater. It is believed that the broth contained other materials not detected or resolved by HPLC. In addition, the residual glucose amount was determined to be in the range of 1-3% by wt based on total solids, suggesting that residual oligosaccharides in the fermentation broths are not detected or resolved through HPLC.

TABLE 2

| Sample | A | B | C | D | E | F | G | H | I |
|---|---|---|---|---|---|---|---|---|---|
| Broth 2 | 1.96 | 72.99 | 32.89 | 43.42 | 73.97 | 0.98 | 79.3 | 76.3 | 78.95 |
| Broth 3 | 2.44 | 75.54 | 23.22 | 54.66 | 78.07 | 2.53 | 82.9 | 77.9 | 80.33 |

Key:
Column A (% oxalic acid at 7.6 min. by RI)
Column B (% Total Gluconic Acid, UV)
Column C (% Sodium Gluconate, calculated from % Na from ICP*)
Column D (% Gluconic Acid("GA"))
Column E (% Total Gluconic acid, RI)
Column F (% Glucose (% Gluconic Acid by RI – % Gluconic Acid by UV))
Column G (% Total (GA + Sodium Gluconate + Glucose + 7.6 min)
Column H (% Sodium Gluconate + Gluconic Acid)
Column I (% Total Solids by oven drying)

EXAMPLE 2

Another sample ("broth 4") supplied by PMP, which was deemed equivalent to broth 3 above, was analyzed by proton NMR spectroscopy. Broth 4 is a concentrated acidic broth. Proton NMR spectra of broth 4 and of a pure sodium gluconate solution are provided, respectively, in FIGS. 4 and 5.

Figure 4:
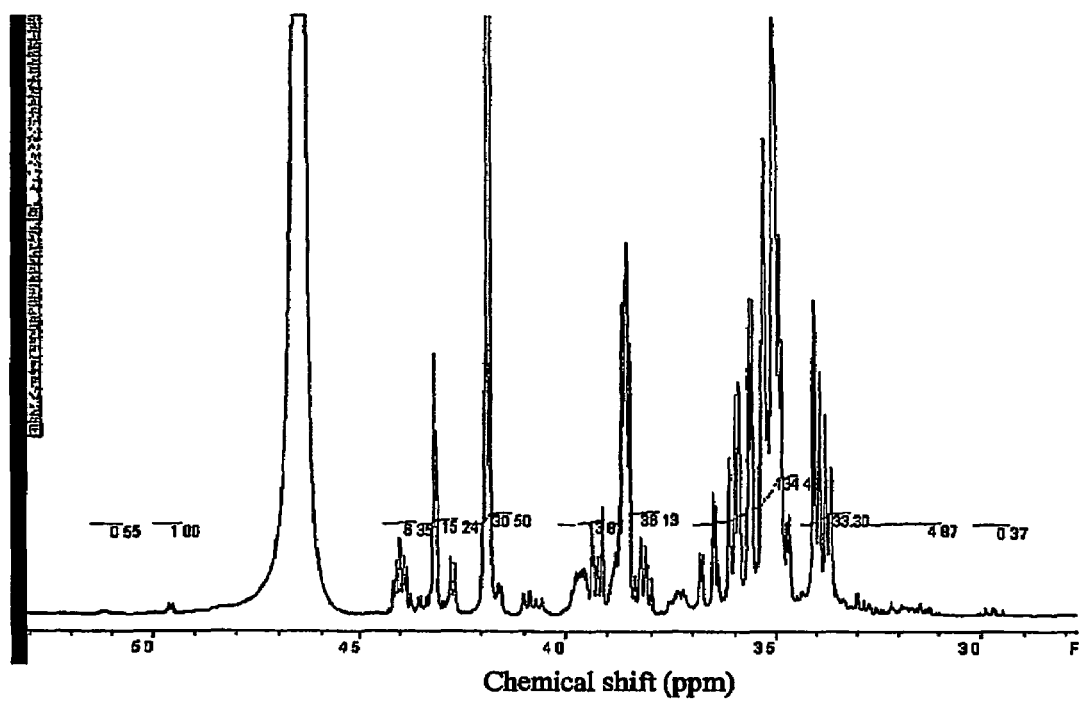
FIG. 4 is a graphic illustration of proton NMR spectrum of another exemplary composition of the invention.
Figure 5:
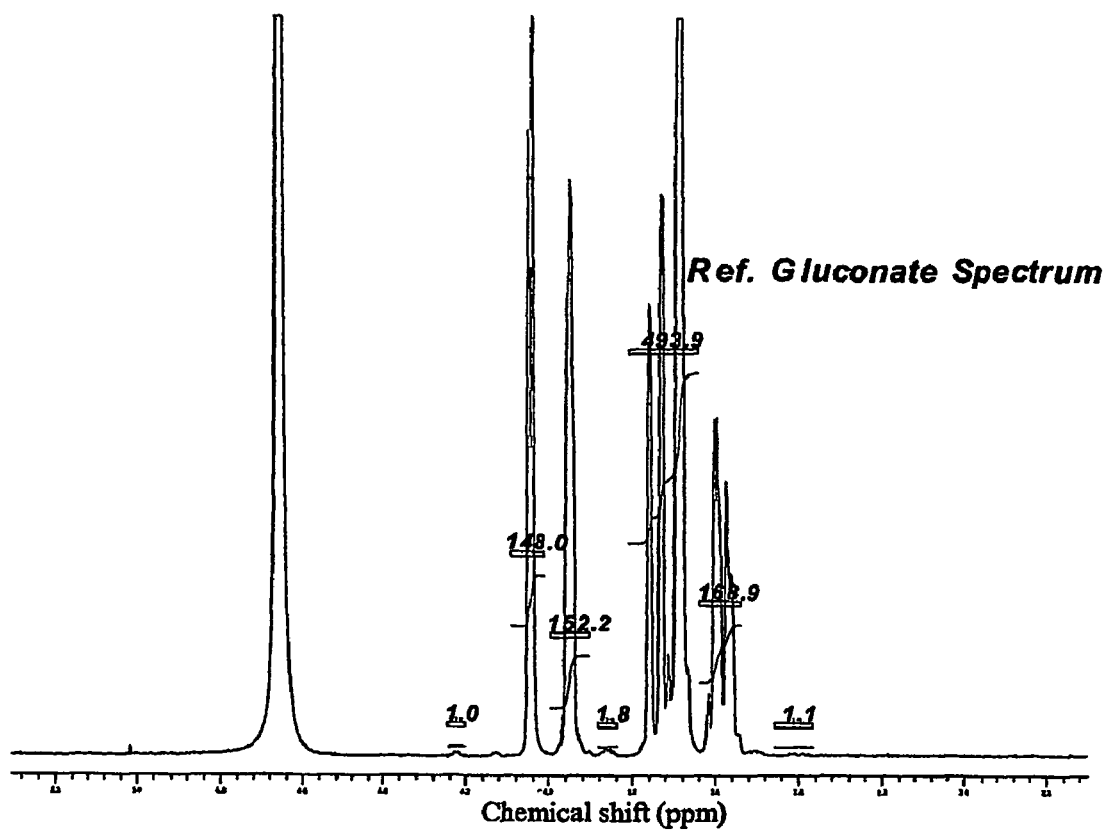
FIG. 5 is a graphic illustration of proton NMR spectrum of pure sodium gluconate (PRIOR ART)

As seen in FIG. 4, the proton NMR spectrum of broth 4 indicates approximately 2% unconverted glucopyranose, plus 6-9% of side reaction products (not characterized). It is estimated that other isomeric forms (e.g. lactone) of glucose fermentation by-product are present.

EXAMPLE 3

Concrete Testing

Broth samples were also tested in concrete in accordance with ASTM C 192 (Standard Practice for Making and Curing Concrete Test Specimens in the Laboratory), ASTM C 143 (Standard Test Method for Slump of Hydraulic-Cement Concrete), ASTM C 39 (Test Method for Compressive Strength of Cylindrical Concrete Specimens), ASTM C 403 (Standard Test Method for Time of Setting of Concrete Mixtures by Penetration Resistance).

The properties of interest in the testing were 9-minute slump, water-reduction, air content of the fresh concrete paste, initial set-time, and compressive strength. The concrete testing conditions were as follows. Dosage of broth was 0.06% solids (neutralized material) by weight of cement, which was Type I Ordinary Portland Cement (conforming to ASTM C150 Standard Specification for Portland Cement). Cement Factor=307 kg/m$^3$, Coarse aggregate=1062 kg/m$^3$, W/C ratio=0.677 and 0.658 (approximately 5% water-cut).

The broth samples used are as follows: broth 1: Unfiltered broth sample from PMP; broth 2: Unfiltered Concentrated Broth sample from Jungbunzlauer; broth 3: Filtered Concentrated Broth sample from Jungbunzlauer; and Pure Sodium Gluconate Powder as reference. Each broth was tested in triplicate. Air contents in the concrete mixtures were below 2%.

Table 3 below displays the slump results of the broths. As seen in Table 2, all the slump data are unexpectedly comparable to pure sodium gluconate powder reference, despite lower purity of the broth samples.

TABLE 3

| | Average concrete slump (mm) of Broth | | | |
|---|---|---|---|---|
| Slump | Pure Sodium Gluconate | Broth 1 | Broth 2 | Broth 3 |
| Test 1 | 191 | 191 | 184 | 191 |
| Test 2 | 191 | 184 | 191 | 184 |
| Test 3 | 165 | 165 | 159 | 140 |
| Average | 182 | 180 | 178 | 171 |
| Std | 15 | 13 | 17 | 28 |

Table 4 below shows the initial setting time data of the broth samples. All samples produced faster setting times than the pure gluconate reference. Thus, the present inventors surmise that the faster setting times are due to the unremoved components in the crude intermediate fermentation broth.

TABLE 4

| | Average initial setting time of Broth (hours:minutes) | | | |
|---|---|---|---|---|
| Set Time (INI) | Pure Sodium Gluconate | Broth 1 | Broth 2 | Broth 3 |
| Test 1 | 6:28 | 5:57 | 5:47 | 6:02 |
| Test 2 | 6:25 | 6:14 | 6:07 | 5:51 |
| Test 3 | 6:26 | 6:17 | 6:26 | 5:55 |
| Average | 6:26 | 6:09 | 6:06 | 5:56 |
| Std | 0:01 | 0:10 | 0:19 | 0:05 |

Tables 5, 6, and 7 below display compressive strength data at 3, 7, and 28 days, respectively for the three broth samples and the pure sodium gluconate control. The data indicates that the compressive strength performance of the crude fermentation broths are equivalent to that of pure gluconate.

TABLE 5

Average 3-day compressive strength (units in MPa)

|  | Pure Sodium Gluconate | Broth 1 | Broth 2 | Broth 3 |
| --- | --- | --- | --- | --- |
| Test 1 | 19.5 | 19.3 | 19.9 | 19.0 |
| Test 2 | 18.9 | 18.7 | 19.1 | 18.5 |
| Test 3 | 18.1 | 17.8 | 17.6 | 17.7 |
| Average | 18.8 | 18.6 | 18.9 | 18.4 |
| Std | 0.7 | 0.8 | 1.1 | 0.7 |

TABLE 6

Average 7-day compressive strength (units in MPa)

|  | Pure Sodium Gluconate | Broth 1 | Broth 2 | Broth 3 |
| --- | --- | --- | --- | --- |
| Test 1 | 23.6 | 23.0 | 23.9 | 23.2 |
| Test 2 | 22.9 | 22.7 | 22.8 | 23.3 |
| Test 3 | 23.7 | 23.6 | 24.1 | 23.1 |
| Average | 23.4 | 23.1 | 23.6 | 23.2 |
| Std | 0.4 | 0.5 | 0.7 | 0.1 |

TABLE 7

Average 28-day compressive strength (units in MPa)

|  | Pure Sodium Gluconate | Broth (1) | Broth (2) | Broth (3) |
| --- | --- | --- | --- | --- |
| Test 1 | 29.5 | 28.4 | 29.5 | 28.6 |
| Test 2 | 28.7 | 27.5 | 29.7 | 28.2 |
| Test 3 | 30.8 | 31.3 | 30.6 | 30.8 |
| Average | 29.6 | 29.1 | 29.9 | 29.2 |
| Std | 1.1 | 2.0 | 0.6 | 1.4 |

EXAMPLE 4

In order to demonstrate the effectiveness of the bioconversion or fermentation of lower Dextrose Equivalent (D.E.) starch hydrolysate as a cement dispersant, the bioconversion experiment of D.E. 63 corn syrup with glucose oxidase enzyme was performed. The sugar analysis of the corn syrup is shown in Table 8.

TABLE 8

| D.E. | Dextrose/glucose (DP = 1) | Maltose (DP = 2) | Malttriose (DP = 3) | Higher sugars (DP > 3) |
| --- | --- | --- | --- | --- |
| 63.4 | 36.6% | 28.8% | 11.1% | 22.9% |

The enzyme used was OXYGO™ 1500 and FERMCOLASE™ 1000 obtained from Genencor (Rochester, N.Y.). Experimental conditions were as follows:
Gencor OXYGO™ 1500 Glucose Oxidase (1500 GOU/ml)
Gencor FERMCOLASE™ 1000 Catalase (129000 CU/ml)
4N NaOH Run Conditions Run Temperature: 35 C.
Concentration: 30% Total Solids
Air Flow Rate: 4.0 SLPM
Mixing Speed: 300 RPM Reactant Charges Corn syrup (D.E.=63/43): 0.268 Moles (based on glucose content)
OXYGO™ 1500:27 GOU/g of ds glucose
FERMCOLASE™ 1000:1599 CU/g of ds glucose
Distilled water added to adjust reaction mix to 30% TS The DE 63 corn syrup and distilled water are charged into a 1 liter jacketed resin kettle equipped with an overhead stirring motor and a circulating water bath. The bath temperature is set at 35° C., and the mixer at 300 RPM. Once the reactor contents reach 35° C., the FERMCOLASE™ 1000 and the OXYGO™ 1500 were added. The pH of the reaction is maintained at 6.0 pH with the addition of 4N NaOH (controlled by a pH process controller). The airflow is added below the surface by an aeration stone at a rate of 4.0 SLPM (throughout the reaction). Each day, additional water is added to maintain the original solution volume. Total run times were 45-90 hours. Once the reaction is complete, reaction mass is cooled and analyzed by HPLC. The yield of the glucose to gluconate conversion was determined to be 86.0-89.9%.

EXAMPLE 5

The product of example 4 was tested in cement paste. The paste test involved the measurement of "mini-slump" (see e.g., D. L. Kantro, Influence of Water-Reducing Admixtures on Properties of Cement Paste—A Miniature Slump Test, Cem. Conc. Aggr., 2 (1980) 95-102). The water to cement ratio was 0.5. Dosage of the product from example 4 was 0.1% dry solids by weight of cement. The results are shown in Table 9.

TABLE 9

| Sample | Average paste flow (mm) | Setting time (hh:mm) |
| --- | --- | --- |
| Blank paste | 87 | 03:31 |
| D.E. 63 Corn syrup | 108 | 08:59 |
| Example 4 | 123 | 08:46 |

As shown in Table 9, the cement dispersion performance (paste flow) of the corn syrup was significantly improved by the enzyme bio-conversion without effecting the setting time of the cement paste.

EXAMPLE 6

The product made in accordance with Example 4 was analyzed by HPLC using carbohydrate column, Biorad Aminex 42A column, and RI detector. Mobile phase was deionized water. The flow rate was 0.6 ml/min. The temperature of the column was 85° C. Detector temperature was 45° C. Injection volume was 15 µl.

Figure 6:
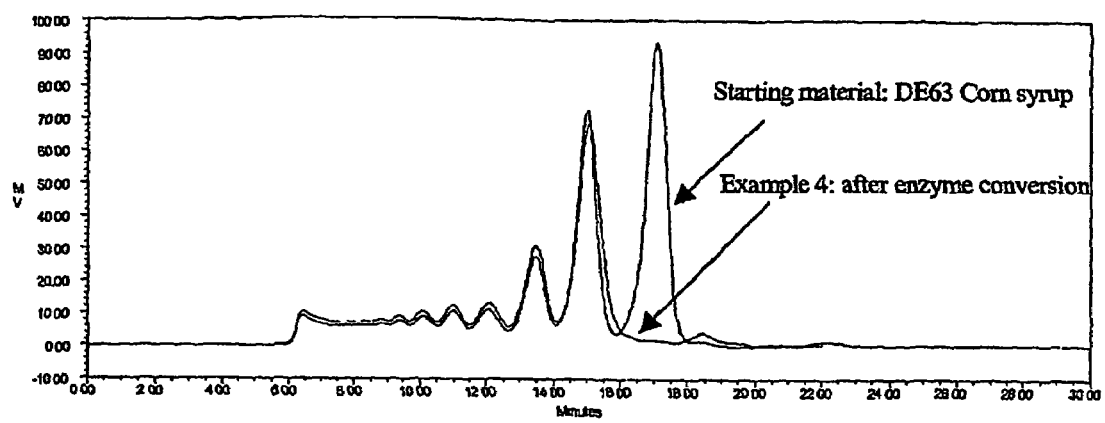
FIG. 6 is a chromatogram of glucose-containing starting material compared to that of fermentation broth after fermentation of the starting material.

FIG. 6 shows the HPLC chromatogram of the product of Example 4 and the starting material, D.E. 63 corn syrup. Table 10 shows the assignment of each peak in the chromatogram.

TABLE 10

| RT (min) | Identity |
| --- | --- |
| 17.1 | Glucose |
| 15.1 | Maltose |
| 13.4 | Maltotriose |

TABLE 10-continued

| RT (min) | Identity |
|---|---|
| 12.1 | Maltotetraose |
| 11 to 6 | Higher sugars |

The results demonstrate that glucose in the corn syrup was converted to gluconic acid while the other oligomers and higher sugars are more or less intact.

In summary, the crude fermentation broths can be favorably used as admixtures for concrete and additives for cement (e.g., clinker grinding addition). In particular, they are found to function well as water reducers and to render unexpectedly superior water reduction performance. They also exhibited setting times shorter than that obtained by pure gluconate powder, and also exhibited good air control and compressive strength development with substantially less unconverted glucose. Moreover, in comparison with "mother liquor" (which is typically obtained after purification of the sodium gluconate and utilized as a concrete admixture), the broths have a higher level of gluconate with substantially bless unconverted glucose.

The foregoing embodiments and examples are provided for illustrative purposes only, and are not intended to limit the scope of the invention.

We claim:

1. A method comprising: combining (A) a hydratable cementitious binder with (B) a crude glucose fermentation broth obtained from an industrial glucose fermentation process.

2. The method of claim 1 wherein said broth is obtained from an industrial glucose fermentation process without having been subjected to three different types of purification: broth filtration, decolorization, and clarification.

3. The method of claim 1 wherein said broth is obtained from an industrial glucose fermentation process without having been subjected to clarification whereby finely suspended particles have been removed from the broth suspension.

4. The method of claim 3 wherein said broth is obtained from said industrial glucose fermentation process without having been subjected to decolorizer, whereby said broth has an amber color.

5. The method of claim 4 wherein said broth is obtained from said industrial glucose fermentation process without having been subjected to a broth filter operative to remove mycelium cell material from said broth, whereby said broth comprises no less than 0.05% and no greater than 20% of mycelium cell material by weight of total solids in said broth.

6. The method of claim 1 wherein said broth, when subjected to high pressure liquid chromatography using a cationic resin packed column and an RI detector or UV detector at 210 nm UV light, demonstrates an elution profile (time vs. refractance) having at least two peaks, a first peak corresponding to gluconic acid or its salt form, and a second peak corresponding to oxalic acid or its salt form.

7. The method of claim 1 wherein said crude fermentation broth comprises: gluconic acid or its salt form, in the amount no less than 20% by wt no greater than 98% by wt, and at least one oligosaccharide selected from the group consisting of maltose, maltotriose, and high sugars, said oligosaccharide being present in an amount no less than 2% by wt and no greater than 80% by wt, all percentages herein being based upon total weight (wt) solids in said broth.

8. The method of claim 1 wherein said crude glucose fermentation broth is derived from a mixture of glucose and starch hydrolysate containing no less than 1% and no greater than 95% by total weight oligosaccharides, said oligosaccharides being selected from the group consisting of maltose, maltotriose, and higher sugars.

9. The method of claim 1 wherein said broth is derived from a mixture of glucose and starch hydrolysate, said starch hydrolysate being present in amount no less than 1% by weight and being selected from the group consisting of maltose, maltotriose, and higher sugars.

10. A composition made by the method of claim 1.

11. A composition made by the method of claim 9.

12. The composition of claim 11 further comprising a cement additive or concrete admixture.

13. A cementitious composition comprising a hydratable cementitious binder and the composition of claim 10.

14. A composition comprising: (A) a crude fermentation broth obtained from an industrial glucose fermentation process; and (B) a cement additive, concrete admixture, or mixture thereof.

15. The cementitious composition of claim 14 wherein said hydratable cementitious binder comprises Portland cement, masonry cement, mortar cement, limestone, hydrated lime, fly ash, granulated blast furnace slag, a pozzolan, silica fume, metakaolin, or mixture thereof.

16. The cementitious composition of claim 15 further comprising an aggregate comprising sand, gravel, crushed stone or mixture thereof.

17. The composition of claim 14 wherein said at least one other additive or admixture comprises at least one alkanolamine.

18. The composition of claim 14 wherein said component (B) is a conventional cement additive selected from the group consisting of molasses, a sulfonate, a melamine sulfonate formaldehyde condensate, a naphthalene sulfonate formaldehyde condensate, calcium chloride, sodium chloride, an amine, a protein, an alkanolamine, tall oil fatty acid, fatty acid or derivative thereof, fatty ester or derivative thereof, alkali and alkaline earth hydroxycarboxylic acid salts of gluconic acid, glucoheptonic acid, citric acid, tartaric acid, mucic acid, malic acid, salicylic acid a dye, sucrose, glucose, alkali, alkaline earth, a choride, a bromide, corn syrup, sodium sarcosinate, calcium or sodium lignosulfonate, lignin, alcohols, phenol, acetic acid, anhydrous caustic soda, sodium hydroxide, potassium hydroxide, sodium linear alkylate sulfonate, formaldehyde, silica, a diglycinate, polymers containing oxyalkylene groups, calcium formate, formic acid, siloxane, a surfactant, a resin, a resin acid, a rosin, a rosin acids, polyacrylic acid, polyvinyl pyrrolidone, alkali, alkaline earth, an aluminate, a nitrite, a nitrate, a silicate, a carbonate, borate, phosphonate, lactate, sulfate, thiosulfate, benzoate, acetate, oxalate, ferricyanide, succinate, glycols, borate ester, phophonate ester, phosphate ester, phenol and derivative thereof, a natural gum, a starch or derivative thereof, and hydrocolloids.

19. The composition of claim 14 wherein said component (B) is a conventional concrete or masonry admixture selected from the group consisting of an accelerator, retarder, air detrainer, air entrainer, alkali-reactivity reducer, bonding admixture, water-reducing admixture, superplasticizer, colorant, corrosion inhibitor, damp proofing admixture, gas forming agent, permeability reducer, pumping aid, fungicidal admixture, germicidal admixture, insecticidal admixture, waterproofing agents, finishing aids, anti-freeze agents, viscosity modifying agents, shrinkage reducing agents, shrinkage-compensating agents, strength enhancing agents, anti-efflorescence agents, expansive agents, and de-icing agent.

20. The composition of claim 14 wherein said component (B) comprises at least one oxyalkylene group.

21. A cementitious composition comprising a hydratable cementitious binder and the composition of claim 14.

22. A process for grinding cement, comprising: introducing to cement clinker, in a cement grinding mill operative to manufacture hydratable cement, a composition made according to claim 1.

23. Method for modifying a cementitious composition comprising combining a cement binder with the composition of claim 14.

24. A process for grinding cement, comprising: introducing to cement clinker, in a cement grinding mill operative to manufacture hydratable cement, a crude glucose fermentation broth and at least one conventional cement additive or concrete or masonry admixture.

* * * * *